March 16, 1926.
O. F. LUNDELIUS
SPRING MOUNTING
Filed Dec. 3, 1923
1,576,920
2 Sheets-Sheet 1
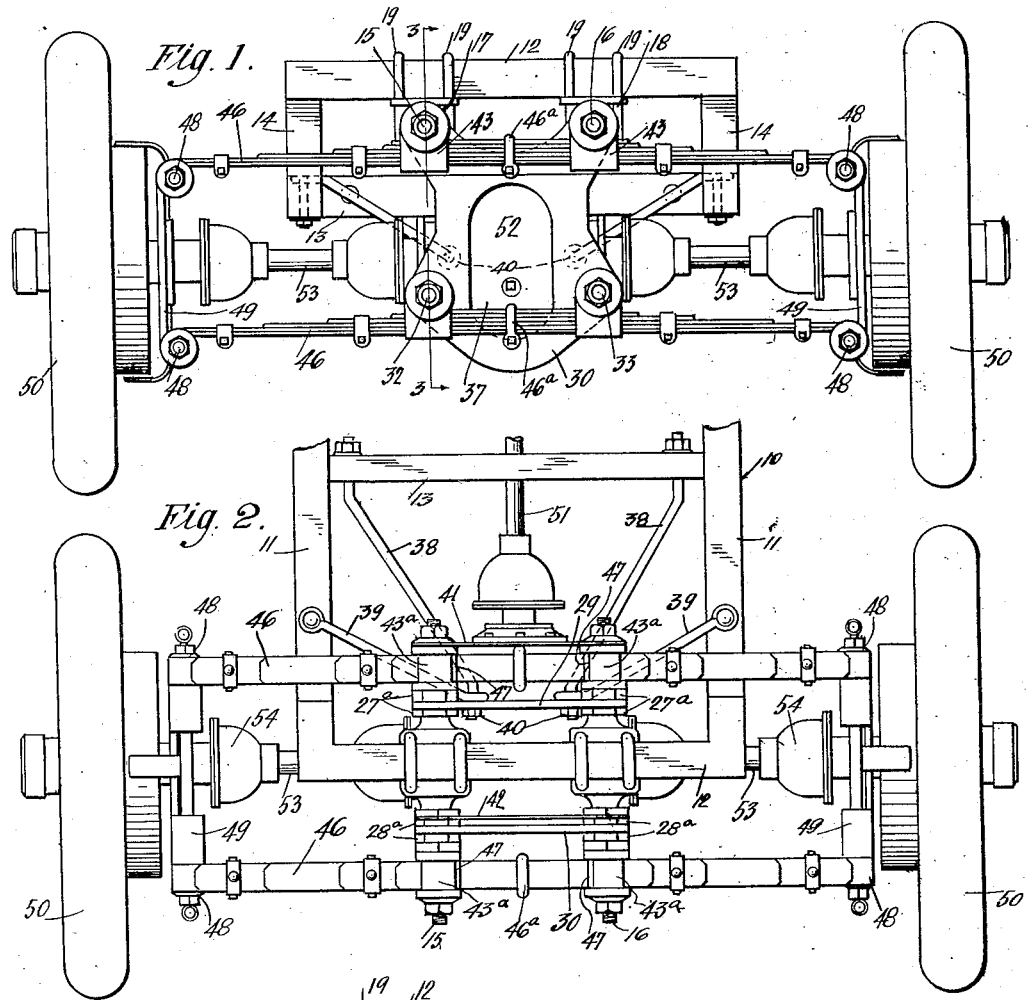

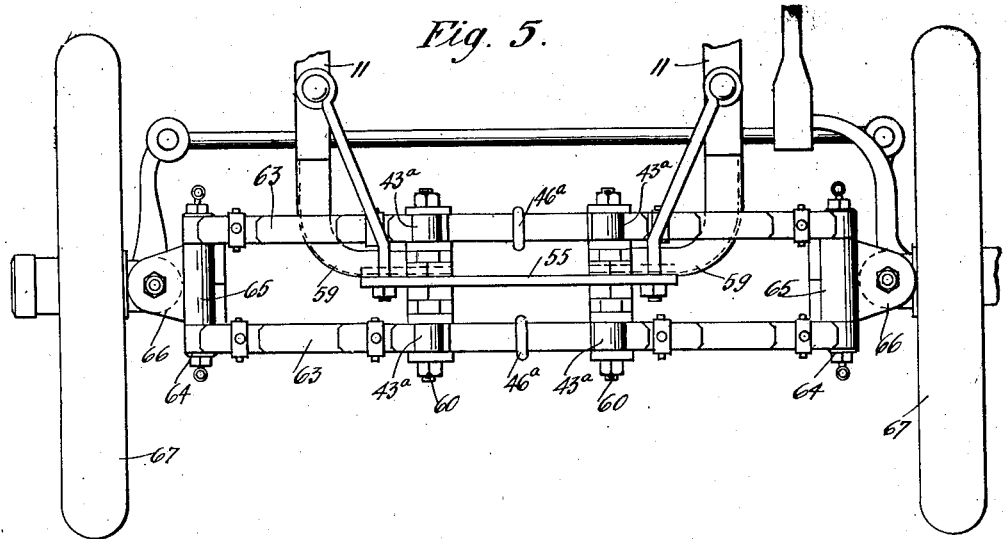
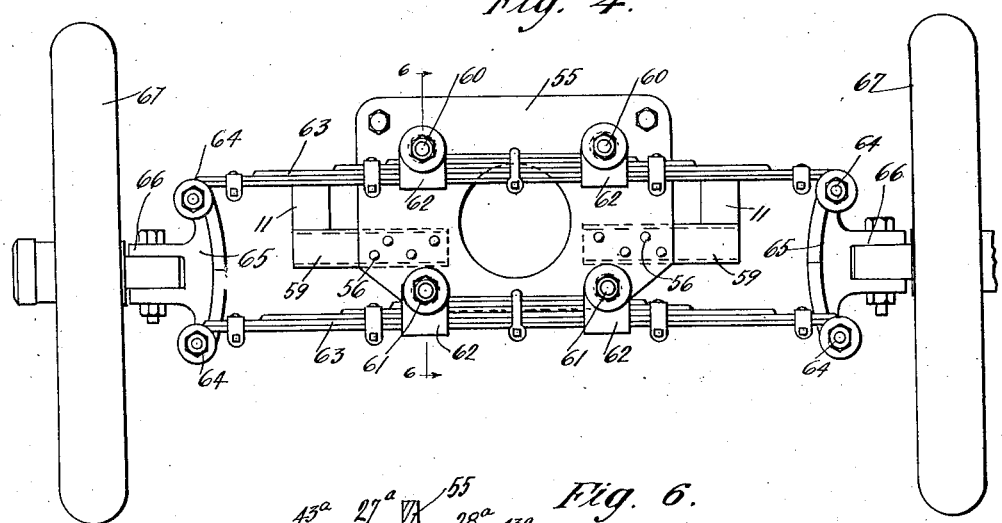
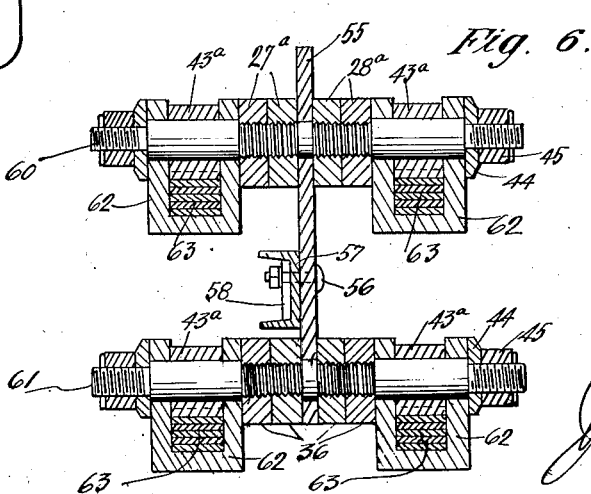

Patented Mar. 16, 1926.

1,576,920

UNITED STATES PATENT OFFICE.

OSCAR FREDERICK LUNDELIUS, OF LOS ANGELES, CALIFORNIA, ASSIGNOR, BY DIRECT AND MESNE ASSIGNMENTS, TO LUNDELIUS & ECCLESTON MOTORS CORPORATION, OF LAS VEGAS, NEVADA, A CORPORATION OF DELAWARE.

SPRING MOUNTING.

Application filed December 3, 1923. Serial No. 678,153.

*To all whom it may concern:*

Be it known that I, OSCAR FREDERICK LUNDELIUS, a citizen of the United States, residing at Los Angeles, in the county of Los Angeles and State of California, have invented new and useful Improvements in Spring Mountings, of which the following is a detailed specification.

This invention relates to spring mountings and more particularly to mountings used in connection with spring suspension systems for motor vehicles.

The mounting has been devised primarily for the purpose of providing a simple, practicable, and highly efficient form of connecting means between a vehicle frame and a plurality of spring members by which the frame is sprung from traction wheels or axles. The mounting provides means for arranging or grouping the several spring members in a variety of manners, whereby certain beneficial results are obtained from the spring members individually and in their coaction.

The mounting may be used to special advantage in connection with a spring system of the type disclosed in my copending application on balanced vehicle spring suspension, Serial No. 678,148, filed under even date herewith, wherein the symmetrical arrangement of the springs and their connections about certain axial planes is of great importance. Such symmetry of spring arrangement is also of importance in connection with the spring systems disclosed in the following applications filed by me under even date herewith: Vehicle spring suspension, Serial No. 678,149, wherein the springs are shown as directly connected to the wheel carrying plates; and spring and brake structures for vehicles, Serial No. 678,152, where the symmetrical arrangement of the springs has certain bearing on the absorption of strains arising from braking torque.

The mounting disclosed and claimed herein, also provides a supporting structure for directly carrying the power generating the units, differential or other power transmitting elements, as described and claimed, per se, in my copending application entitled differential mounting, Serial No. 678,151, filed under even date herewith.

The claims of the present application, however, are restricted to the mounting and do not overlap on the claims of the other applications referred to above. Neither are the above references to be construed as limitations on the range of application of the present invention.

The mounting, broadly considered, consists of suspension plates on the vehicle frame which serve to support a plurality of studs, the studs being adapted to carry hangers wherein the springs are mounted. Preferably the spring hangers are pivotally mounted on their associated studs, whereby full spring flexibility is obtained, but this feature of construction and mounting is described and claimed, per se, in my co-pending application on vehicle spring, Serial No. 678,150, filed under even date herewith.

An understanding of the invention will be had from the following detailed description, reference being had to the accompanying drawings, in which:

Fig. 1 is a fragmentary rear end view of a vehicle chassis, equipped with my improved spring mounting;

Fig. 2 is a top plan view of Fig. 1;

Fig. 3 is an enlarged transverse section on line 3—3 of Fig. 1;

Fig. 4 is a fragmentary front end view of a vehicle chassis equipped with my spring mounting;

Fig. 5 is a top plan view of Fig. 4; and

Fig. 6 is an enlarged transverse section on line 6—6 of Fig. 4.

The mounting may be applied with equal advantage to either the front or rear spring suspension system of a vehicle, there being necessary only minor structural changes between the front and rear equipment. I have illustrated both applications and will first proceed to a description of Figs. 1 to 3, inclusive, wherein the rear end spring system is shown.

A vehicle frame is generally indicated at 10, the side rails 11 thereof, being joined by end rail 12 and cross brace 13. End rail 12 is preferably raised above the side rails at 14, whereby sufficient clearance is obtained for the spring system without materially raising the center of gravity of the vehicle.

Studs 15 and 16, extending in substantial parallelism with side rails 11, are carried beneath end rail 12 by stud hangers 17 and 18, respectively, which hangers are preferably spaced equally from the center of said end rail. Each hanger 17, 18, consists of U-bolts 19 and stud clamping members 20 and 21, the ends of the bolts depending from each side of the rail and through the members 20 and 21, as clearly shown in Figure 3, so by taking up nuts 22, the clamping members are drawn tightly about the medial portion 15ª of the associated stud, which medial portion is preferably of reduced diameter, and held against the bottom of rail 12 in a manner to rigidly tie the stud to the rail.

At one side of its hanger 17, each stud has a threaded portion 23, spring hanger bearing 24, and threaded extremity 25; while at the opposite side of its hanger, each stud has threaded portion 26, spring hanger bearing 27, and threaded extremity 28.

Suspension members or plates 29 and 30 are suitably apertured at 31, whereby they may be fitted over studs 15 and 16 from opposite sides of hangers 17; the plates being laterally positioned on stud portions 23 and 26 by nuts 27ª and 28ª threaded on said portions.

Lower studs 32 and 33, which are of identical construction with studs 15 and 16 and therefore need not be described in detail, are supported by the suspension plate, being passed through registering apertures 34 and 35 in plates 29 and 30, and being held against longitudinal movement by nuts 36. In the drawings, studs 32 and 33 are in vertical alinement with studs 15 and 16, respectively, and the vertical spacing of the studs is equal to the lateral spacing thereof. Preferably, the several studs and their associated spring hangers and springs are symmetrically arranged about substantially vertical and horizontal axial planes, whereby the stresses and strains arising from road shocks, traction, etc., are uniformly distributed through the several studs rather than being concentrated on any one or a few of the studs; which condition is of obvious advantage. This particular symmetrical arrangement of the studs is not necessary to the present invention, although it is of importance in certain spring installations, for instance, in the spring system described and claimed in my aforementioned application on balanced vehicle spring suspension.

Plates 29 and 30 may be centrally cut away as at 37 to reduce their weight, and in certain situations to allow for the protrusion therethrough of vehicle structural elements. Braces 38 and 39, extending from cross members 13 and side rails 11, respectively, are bolted at 40 to plates 29 and serve to aid in holding the plate and stud assembly in proper position with respect to the frame. Plates 41 and 42, mounted on the studs similarly to plates 29 and 30, are for the purpose of supporting certain structural elements of the vehicle, or parts of the drive mechanism, as fully set forth in my aforementioned application on differential mounting.

Spring hangers 43 and their bushings 43ª are pivotally mounted on each of the stud bearings 27, being positioned thereon by certain of nuts 27ª and 28ª, previously described, and washers and nuts 44 and 45 on the threaded extremities of the studs. Laminated or leaf springs 46 are supported by the spring hangers, being held from displacement by clamps 46ª and the coaction between bushings 43ª and the upturned ends 47 of the uppermost spring leaf. My copending application on vehicle springs, fully sets forth and claims the herein illustrated method of pivotally mounting the individual springs about their points of support, that is about the studs, wherein increased spring flexibility is obtained.

The ends of springs 46 are pivotally connected at 48 to plates 49 which indirectly support traction wheels 50, the power for driving these wheels being transmitted from a power plant (not shown) through propeller shaft 51, differential 52, and drive shafts 53. A preferred method of supporting and driving the traction wheels through universal joints 54 is fully set forth in my copending application on balanced vehicle spring, but is not a part of this invention, and therefore need not be described here.

Now referring to Figs. 4 to 6, it will be seen that the general system of spring support is similar to that just described, except that certain parts, duplicated in the rear end system, are eliminated, the single suspension plate 55 is mounted directly on the frame rather than through hangers, and certain other structural changes made to accommodate the mounting to the peculiarities of the forward end of the vehicle frame and adjacent structure.

Plate 55 is bolted at 56 through webs 57 and reinforcing straps 58 of channels 59, which latter extend inwardly from side rails 11.

Upper and lower studs 60 and 61, spring hangers 62, and springs 63 are of similar construction to the corresponding members of the rear end system, and are arranged and mounted in the same manner, except as regards certain dimensional proportions, which are apparent from the drawings and are not important in themselves.

The symmetrical arrangement of the studs differs from that of the rear end system only in that the horizontal spacing of the studs is greater than the vertical spacing. The ends of springs 63 are pivotally connected at 64 to plates 65 which carry the steering knuckle yokes 66 for operatively connecting the spring system to front wheels 67.

It will be apparent to those skilled in the art that certain changes in design, structure and arrangement may be made in the device without departing from the spirit and scope of the invention, and therefore I do not wish to be limited to the particular showing and description here made, except for such limitation as a fair interpretation of the appended claims may impart.

I claim:

1. A mounting for connecting springs to a spring supported structure, embodying a suspension member mounted on the structure, studs extending from opposite sides of the member, and spring hangers mounted on the studs at opposite sides of the member.

2. A mounting for connecting springs to a spring supported structure, embodying a suspension member mounted on the structure, studs extending laterally through and beyond the suspension member, and spring hangers mounted on the stud extensions at opposite sides of the member.

3. A mounting for connecting springs to a spring supported structure, embodying a suspension member mounted on the structure, studs extending laterally through and beyond the suspension member, detachable means for securing the studs against movement with respect to the member, and spring hangers mounted on the stud extensions at opposite sides of the member.

4. A mounting for connecting springs to a spring supported structure, embodying a suspension member mounted on the structure, studs extending from opposite sides of the member, and spring hangers pivotally mounted on the studs at opposite sides of the member.

5. A mounting for connecting springs to a spring supported structure embodying a suspension plate mounted on the structure, studs extending from the plate and symmetrically arranged about a substantially horizontal axial plane, and similarly arranged means for operatively connecting the studs and springs.

6. A mounting for connecting springs to a spring supported structure, embodying a suspension plate mounted on the structure, studs extending from the plate and symmetrically arranged about substantially horizontal and vertical axial planes, and similarly arranged means for operatively connecting the studs and springs.

7. A mounting for connecting springs to a spring supported structure, embodying a suspension member mounted on the structure, studs extending laterally through and beyond the suspension member, and spring hangers mounted on the studs at opposite sides of the member, the studs and spring hangers being symmetrically arranged about a substantially horizontal axial plane.

8. A mounting for connecting springs to a spring supported structure, embodying a suspension member mounted on the structure, studs extending laterally through and beyond the suspension member, and spring hangers mounted on the studs, the studs and spring hangers being symmetrically arranged about substantially horizontal and vertical axial planes.

In witness that I claim the foregoing I have hereunto subscribed my name this 17th day of November, 1923.

OSCAR FREDERICK LUNDELIUS.